US012534945B2

(12) United States Patent
Qi et al.

(10) Patent No.: US 12,534,945 B2
(45) Date of Patent: Jan. 27, 2026

(54) DOOR HINGE

(71) Applicant: Shandong Huajing Cold Chain Technology Co., LTD, Qingzhou (CN)

(72) Inventors: Jianqing Qi, Qingzhou (CN); Xintian Li, Qingzhou (CN); Shiwen Fang, Qingzhou (CN); Jun Wang, Qingzhou (CN)

(73) Assignee: Shandong Huajing Cold Chain Technology Co., LTD., Qingzhou (CN)

( * ) Notice: Subject to any disclaimer, the term of this patent is extended or adjusted under 35 U.S.C. 154(b) by 0 days.

(21) Appl. No.: 18/803,265

(22) Filed: Aug. 13, 2024

(65) Prior Publication Data

US 2025/0075545 A1 Mar. 6, 2025

(30) Foreign Application Priority Data

Sep. 5, 2023 (CN) ........................ 202311136936.2

(51) Int. Cl.
*E05D 7/04* (2006.01)
*E05D 7/00* (2006.01)

(52) U.S. Cl.
CPC ......... *E05D 7/0415* (2013.01); *E05D 7/0027* (2013.01); *E05D 7/0423* (2013.01)

(58) Field of Classification Search
CPC ... E05D 7/0009; E05D 7/0018; E05D 7/0027; E05D 7/0045; E05D 7/0415; E05D 7/0423; E05D 2007/0469; E05D 2007/0484; E05D 2007/0492; E05F 1/123
See application file for complete search history.

(56) References Cited

U.S. PATENT DOCUMENTS 1,056,171 A * 3/1913 Henry .................. E05F 1/1223 16/284
1,105,852 A * 8/1914 Sherwood ............ E05F 1/1215 49/386

(Continued)

FOREIGN PATENT DOCUMENTS

| | | |
|---|---|---|
| CN | 103808104 | 5/2014 |
| CN | 115822403 | 3/2023 |
| KR | 20040046106 | 6/2004 |

*Primary Examiner* — Jeffrey O'Brien
(74) *Attorney, Agent, or Firm* — Knobbe, Martens, Olson & Bear, LLP

(57) ABSTRACT

Provided is door hinge. Hinge seat therein has first adjustment mechanism moving back and forth along installation direction, and hinge core is located on one side of first adjustment mechanism; and first adjustment mechanism is fixedly provided with second adjustment mechanism and third adjustment mechanism, and hinge core, second adjustment mechanism, and third adjustment mechanism move simultaneously with first adjustment mechanism. Hinge core includes core part, first adjustment part, and second adjustment part, wherein first adjustment part is located on one end of core part away from first adjustment mechanism, and second adjustment part is located outside core part. Second adjustment mechanism drives second adjustment part to rotate, wherein second adjustment part rotates to drive core part to move along direction perpendicular to plane where first adjustment mechanism is located, and third adjustment mechanism drives first adjustment part to rotate.

9 Claims, 12 Drawing Sheets

(56) References Cited

U.S. PATENT DOCUMENTS

| | | | | | |
|---|---|---|---|---|---|
| 3,339,225 | A * | 9/1967 | John | E05F 1/1215 | 16/300 |
| 4,646,472 | A * | 3/1987 | Sugawara | E05F 1/123 | 16/75 |
| 4,696,078 | A * | 9/1987 | Stromquist | E05D 7/081 | 16/301 |
| 4,905,347 | A * | 3/1990 | Wroth | E05F 1/123 | 16/75 |
| 5,321,870 | A * | 6/1994 | Wada | E05F 1/123 | 16/300 |
| 5,333,355 | A * | 8/1994 | Beswick | E05D 7/081 | 16/75 |
| 6,978,516 | B1 * | 12/2005 | Calderon | E05F 1/123 | 16/361 |
| 7,334,293 | B2 * | 2/2008 | Erickson | E05D 7/0423 | 16/245 |
| 8,650,712 | B2 * | 2/2014 | Wach | E05F 1/123 | 16/236 |
| 10,982,473 | B1 * | 4/2021 | Pylypczak | E05D 7/0027 | |
| 10,982,475 | B2 * | 4/2021 | Iwata | E05D 7/04 | |
| 11,208,835 | B2 * | 12/2021 | Su | E05F 1/00 | |
| 12,209,446 | B2 * | 1/2025 | Haney | E05D 7/0423 | |
| 2013/0283566 | A1 * | 10/2013 | Wach | E05F 1/123 | 16/245 |

* cited by examiner

DOOR HINGE

CROSS-REFERENCE TO RELATED APPLICATION

The present disclosure claims the priority to the Chinese patent application with the filling No. 2023111369362 filed with the Chinese Patent Office on Sep. 5, 2023, and entitled "DOOR HINGE", the contents of which are incorporated herein by reference in entirety.

TECHNICAL FIELD

The present disclosure belongs to the technical field of the hinge, and particularly relates to a door hinge.

BACKGROUND ART

At present, a refrigerator (e.g., the refrigerator in the supermarket for storing food at low temperature) is a main device commonly used for storing food. The refrigerator generally includes a cabinet door and a cabinet body, wherein the cabinet door can rotate on the cabinet body to open or close the interior space of the cabinet body. The above process is performed by fixedly setting a door hinge on the cabinet body of the refrigerator. The door hinge includes a hinge seat and a hinge core, and an end of a cylindrical door shaft on the cabinet door of the refrigerator is inserted into the hinge core of the door hinge. Since a spring is arranged in the door shaft body, the door shaft itself produces a certain torsion during a process of fixing the door shaft and the door hinge (i.e., the door shaft body is fixedly connected to the cabinet door, and then a hexagonal bolt of the end of the door shaft is fixed into the hinge core after rotated at a certain angle, so that the spring in the door shaft body produces a certain torsion, wherein the above process that the hexagonal bolt of the end of the door shaft cooperates with the hinge core after rotated is called preload). The cabinet door cooperates with the cabinet body in a rotating manner during the rotation process, wherein the cabinet door is rotated by the torsion of the door shaft itself, so that the cabinet door can rotate on the cabinet body to open or close the cabinet body. When installing the cabinet door to the cabinet body, the top and bottom of the cabinet door are both provided with the door shafts, and the door hinges are arranged at positions where the cabinet body cooperates with the door shafts of the cabinet door; and then the ends of the door shafts fixed on the cabinet door are inserted into the hinge core, so that the cabinet door is mounted on the cabinet body.

In order to make the cabinet door cooperate with the cabinet body more precisely when installing the cabinet door, it needs to fine adjust the matching part of the door shaft and hinge core to ensure that they are coaxially arranged. However, the door hinge in the prior art is pre-fixed on the cabinet body, and its interior is not provided with an adjustment mechanism. After the door shaft is inserted into the hinge core, the weight of the cabinet door is concentrated between the cabinet body and the cabinet door, and the gap therebetween is narrow, so that a position of the hinge core is no longer to be adjusted, and the position where the hinge core cooperates with the door shaft cannot be adjusted, and therefore a rotation angle (i.e., a preload angle) at the position where the door shaft cooperates with the hinge core cannot be adjusted.

SUMMARY

The present disclosure provides a door hinge, which solves problems in the prior art that a matching part of a door shaft and a door hinge cannot be adjusted, and a preload angle at the matching part of the door shaft and the door hinge cannot be adjusted.

The technical solutions of the present disclosure are realized in the following ways. A door hinge is fixedly arranged on the cabinet body, and the door hinge includes a hinge scat and a hinge core, wherein the hinge seat has an accommodation cavity, and the hinge core is located in the accommodation cavity of the hinge seat for connecting to the door shaft, the hinge seat therein has a first adjustment mechanism moving back and forth along an installation direction, and the hinge core is located on one side of the first adjustment mechanism; the first adjustment mechanism is fixedly provided with a second adjustment mechanism and a third adjustment mechanism, and the hinge core, the second adjustment mechanism, and the third adjustment mechanism move simultaneously with the first adjustment mechanism, wherein the hinge core includes a core part, a first adjustment part, and a second adjustment part, wherein the first adjustment part is located on one end of the core part away from the first adjustment mechanism, and the second adjustment part is located outside the core part; and the second adjustment mechanism drives the second adjustment part to rotate, wherein the second adjustment part rotates to drive the core part to move along a direction perpendicular to a plane where the first adjustment mechanism is located, and the third adjustment mechanism drives the first adjustment part to rotate.

The position of the hinge core is adjusted in two mutually perpendicular planes through arranging the first adjustment mechanism and the second adjustment mechanism in the door hinge, so that the matching part of the hinge core and the door shaft is adjusted; and the rotation position of the hinge core is adjusted through arranging the third adjustment mechanism, so that the rotation angle of the matching part of the door shaft and the door hinge is also set to a suitable angle, so as to achieve the preload process of the door shaft.

As a preferred embodiment, a first adjustment groove and a second adjustment groove are separately arranged on two sides of the hinge seat, and two ends of the first adjustment mechanism separately move at the first adjustment groove and the second adjustment groove, wherein the first adjustment groove is provided with and communicates with a plurality of upper grooves equally spaced, and one end of the first adjustment mechanism is provided with lower grooves corresponding to the upper grooves, wherein the plurality of upper grooves and the lower grooves cooperate to form adjustment holes with different height, wherein ends of the first adjustment mechanism, the second adjustment mechanism, and the third adjustment mechanism are separately provided with operation holes, and cach operation hole is corresponding to a different adjustment hole.

As a preferred embodiment, the first adjustment mechanism includes a support plate, and a movable hole is arranged on one side of the support plate away from the hinge core; the hinge seat includes an upper housing and a lower housing; the hinge core is located between the upper housing and the support plate; and the first adjustment part and the second adjustment part rotationally cooperate with the upper housing and the support plate respectively, wherein the lower housing is fixedly provided with the supporting block, and the supporting block cooperates with the first adjustment worm through screw threads; and the upper housing is provided therein with a baffle, and the baffle extends from an inside wall of the upper housing to a position between the first adjustment worm and the hinge core, wherein the baffle is located in the movable hole, and the first adjustment worm rotates to drive the upper housing, the support plate, and the hinge core to simultaneously move along an installation direction of the lower housing.

As a preferred embodiment, the support plate is fixedly provided with an insert block, and one side of the baffle opposite to the first adjustment worm is provided with a curved groove, wherein one side of the insert block opposite to the upper housing is inserted into the curved groove and cooperates with the curved groove to form a third circular hole, and one side of the first adjustment worm opposite to the hinge core is rotationally arranged in the third circular hole.

As a preferred embodiment, one side of the support plate is provided with a rotary groove, and the second adjustment mechanism is rotationally arranged in the rotary groove; the other side of the support plate is provided with a support frame, and the third adjustment mechanism is rotationally arranged on the support frame, wherein one side of the upper housing is provided with a first circular hole, and the support plate is provided with a second circular hole corresponding to the first circular hole, wherein the first adjustment part is rotationally arranged in the first circular hole, and the second adjustment part is arranged in the second circular hole.

As a preferred embodiment, a first gear ring is fixedly arranged outside the first adjustment part along its circumference, and the first adjustment mechanism engages with the first gear ring to drive the first gear ring to rotate; one end of the first adjustment part away from the core part is provided with a polygonal hole, and one end of the first adjustment part corresponding to the core part is provided with a first cylindrical hole, wherein the core part is movably arranged in the first cylindrical hole; the polygonal hole communicates with the first cylindrical hole; and a diameter of the first cylindrical hole is larger than a maximum width of the polygonal hole.

As a preferred embodiment, a second gear ring is fixedly arranged outside the second adjustment part along its circumference, and the second adjustment mechanism engages with the second gear ring to drive the second gear ring to rotate; and the second adjustment part is provided with a second cylindrical hole along its axial direction, wherein a surface of the second cylindrical hole is provided with internal screw threads; the outside of the core part is provided with external screw threads; and the internal screw threads are connected threadedly with the external screw threads.

As a preferred embodiment, a third cylindrical hole passes through a center of the core part along its axial direction, wherein the first cylindrical hole, the second cylindrical hole, and the third cylindrical hole are coaxially arranged; the core part moves in the first cylindrical hole and the second cylindrical hole along their axial directions; and a diameter of the core part is larger than the maximum width of the polygonal hole and smaller than the diameter of the first circular hole.

As a preferred embodiment, a surface of the core part is provided with a plurality of sliding grooves equally spaced in an axial direction, and a spacer plate is arranged between the first adjustment part and the second adjustment part, wherein the spacer plate is provided with a fourth cylindrical hole; a surface of the fourth cylindrical hole is fixedly provided with guide blocks corresponding to the sliding grooves; and the guide blocks are inserted into the sliding grooves and movably cooperate with the sliding grooves.

As a preferred embodiment, a mounting part arranged vertically and integrally on a bottom of the lower housing; a screw thread hole is arranged in the mounting part; and the screw thread hole is arranged coaxially with the hinge core.

By adopting the foregoing technical solutions, the present disclosure includes the following beneficial effects.

1. In the present disclosure, the adjustment of hinge core in the horizontal direction is realized by the driving of the first adjustment worm; the adjustment of the hinge core in the vertical direction is realized by the adjusting of the third adjustment component; and the preload angle of the hinge core is changed by the driving of the second adjustment component. Three adjustment methods of the hinge core foregoing are realized by worm gear and worm structures, wherein the three adjusting structures are integrated into the same part, so that the integration of each component of the door hinge is higher.
2. When adjusting the position of the cabinet door in the horizontal direction, the first adjustment worm is driven to rotate, and the upper housing, the hinge core, and the support plate are driven to move in the horizontal direction to a suitable position. At this time, the hinge core cooperating with the end part of the door shaft moves in the horizontal direction in a direction perpendicular to the lower housing, so as to adjust the cabinet door in the vertical direction. The adjustment process can be realized only by driving the first adjustment worm to rotate, and is simple to operate.
3. When adjusting the position of the cabinet door in the direction perpendicular to the ground, the second adjustment mechanism is driven to rotate, so that the second adjustment part is driven to rotate, and the second adjustment part rotationally drives the internal core part to move up and down. At this time, the core part cooperating with the end part of door shaft is in the vertical direction, so that the height of the cabinet door in the vertical direction can be adjusted. The adjustment of the height of the core part is realized by the rotation of the second adjustment part; and the adjustment of the core part in the horizontal direction is realized by the first adjustment mechanism, wherein the adjustments in the horizontal direction and height direction can be performed individually or simultaneously, so as to realize the adjustment process in the limited space.
4. The third adjustment mechanism is driven to drive the first adjustment part to rotate, and the first adjustment part rotates, so as to drive the polygonal hole to rotate to an appropriate preload angle. The height adjustment, horizontal adjustment, and preload angle adjustment are integrated into the door hinge, so that the door hinge has a compact structure and small volume. The cooperation position of the cabinet door and the cabinet body can be adjusted again after installation, and the adjustment process is less limited by the space.

BRIEF DESCRIPTION OF DRAWINGS

In order to more clearly illustrate the technical solutions in the embodiments of the present disclosure or the prior art, the drawings to be used in the description of the embodiments or prior art will be briefly introduced below. It is obvious that the drawings in the following description are only some embodiments of the present disclosure. For a person of ordinary skill in the art, other drawings can be obtained based on these drawings without inventive efforts.

Figure 1:
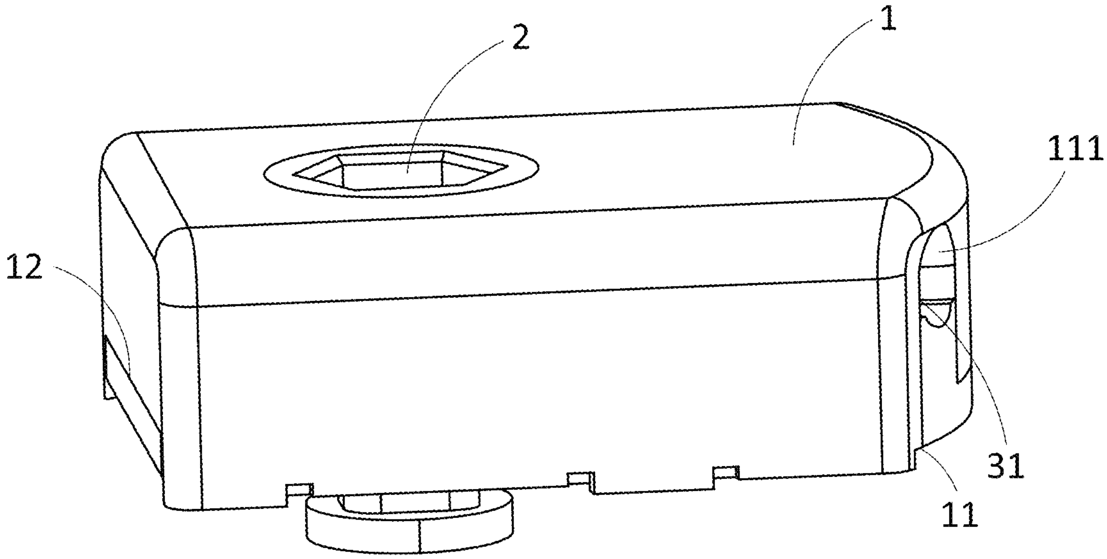
FIG. 1 shows a schematic structure diagram of the present disclosure.

Reference numbers: 1—hinge seat; 11—first adjustment groove; 111—upper groove; 12—second adjustment groove; 13—upper housing; 131—baffle; 1311—curved groove; 1312—third circular hole; 132—first circular hole; 14—lower housing; 141—supporting block; 1412—first adjustment worm; 142—mounting part; 1421—screw thread hole; 2—hinge core; 21—core part; 211—third cylindrical hole; 212—sliding groove; 22—first adjustment part; 221—first gear ring; 222—polygonal hole; 223—first cylindrical hole; 23—second adjustment part; 231—second gear ring; 232—second cylindrical hole; 24—spacer plate; 241—fourth cylindrical hole; 2411—guide block; 3—first adjustment mechanism; 31—lower groove; 32—support plate; 321—movable hole; 322—insert block; 323—rotary groove; 324—support frame; 325—second circular hole; 33—adjustment hole; 331—operation hole; 4—second adjustment mechanism; 5—third adjustment mechanism.

DETAILED DESCRIPTION OF EMBODIMENTS

The technical solutions in the embodiments of the present disclosure will be clearly and completely described below in conjunction with the drawings in the embodiments of the present disclosure. It is clear that the embodiments described are only partial embodiments of the present disclosure, and not all of the embodiments. Based on the embodiments in the present disclosure, all other embodiments obtained by a person of ordinary skill in the art without inventive efforts, shall fall within the scope of protection of the present disclosure.

As shown in FIG. 1-FIG. 12, a door hinge is fixedly arranged on the cabinet body, and the door hinge includes a hinge seat 1 and a hinge core 2, wherein the hinge seat 1 has an accommodation cavity, and the hinge core 2 is located in the accommodation cavity of the hinge seat 1 for connecting to the door shaft, wherein the hinge seat 1 therein has a first adjustment mechanism 3 moving back and forth along an installation direction, and the hinge core 2 is located on one side of the first adjustment mechanism 3; and the first adjustment mechanism 3 is fixedly provided with a second adjustment mechanism 4 and a third adjustment mechanism 5, and the hinge core 2, the second adjustment mechanism 4, and the third adjustment mechanism 5 move simultaneously with the first adjustment mechanism 3, wherein the hinge core 2 includes a core part 21, a first adjustment part 22, and a second adjustment part 23, wherein the first adjustment part 22 is located on one end of the core part 21 away from the first adjustment mechanism 3, and the second adjustment part 23 is located outside the core part 21; and the second adjustment mechanism 4 drives the second adjustment part 23 to rotate, wherein the second adjustment part 23 rotates to drive the core part 21 to move along a direction perpendicular to a plane where the first adjustment mechanism 3 is located, and the third adjustment mechanism 5 drives the first adjustment part 22 to rotate.

When a cabinet door is mounted on a cabinet body, the door hinge is pre-installed on the cabinet body. When a door shaft on a door body is inserted into the door hinge, the end of the door shaft passes through the first adjustment part 22, the core part 21, and the second adjustment part 23 of the hinge core 2 in sequence; a hexagonal bolt of the door shaft is inserted into the first adjustment part 22; and the end of the door shaft in an axial direction passes through a part of the core part 21, and is fixedly connected with the core part 21 (the fix connection can adopt an interference fit, which is a prior art, and the present disclosure will not repeat). The preliminary installation of the cabinet door is completed. It needs to be further precisely adjusted after the preliminary installation is completed. At this time, the first adjustment mechanism 3 is firstly driven to move back and forth along an installation direction (i.e., a horizontal direction perpendicular to the door shaft) of the door hinge, and the first adjustment mechanism 3 moves back and forth to drive the hinge core 2 to move simultaneously, wherein the cooperation position that the door shaft is fixed with the hinge core 2 moves along with the movement of the hinge core 2 during the movement of the hinge core 2. The matching parts of the door shaft and the hinge core 2 are constantly adjusted until they are coaxial and their axes coincide. The process is to adjust the position of the hinge core 2 in an arrangement direction of the door hinge. During the process of adjusting the hinge core 2 along the arrangement direction of the hinge core, a depth of the matching part of the door shaft and the door hinge also changes. At this time, it needs to drive the second adjustment mechanism 4, and then the second adjustment part 23 is driven to rotate; the second adjustment part 23 rotates to drive the core part 21 to move along a direction perpendicular to a plane where the door hinge is provided; and the core part 21 drives the door shaft to move in the movement process, so that the door shaft moves in the vertical direction. Since the door shaft body and the cabinet door are fixed connected, the cabinet door and door shaft are at a suitable distance from the door hinge in the foregoing process. After the hinge core 2 is adjusted in the above two perpendicular directions, the third adjustment mechanism 5 is driven to adjust a rotation angle of the first adjustment part 22. Since the hexagonal bolt of the door shaft is located in the first adjustment part 22, the first adjustment part 22 rotates to drive the hexagonal bolt part of the door shaft to rotate. The cabinet door body in the cabinet door is used to fix the hexagonal bolt part, so that a spring inside the door shaft body produces a certain torsion. The position of the hinge core 2 in two perpendicular planes is adjusted by the arrangement of the first adjustment mechanism 3 and the second adjustment mechanism 4 in the door hinge, so that the matching part of the hinge core 2 and the door shaft is also adjusted. The rotation position of the hinge core 2 is adjusted by the arrangement of the third adjustment mechanism 5, so that the rotation angle of the matching part of the door shaft and the door hinge is also adjusted to the suitable angle, so as to realize the preload process of the door shaft.

Figure 2:
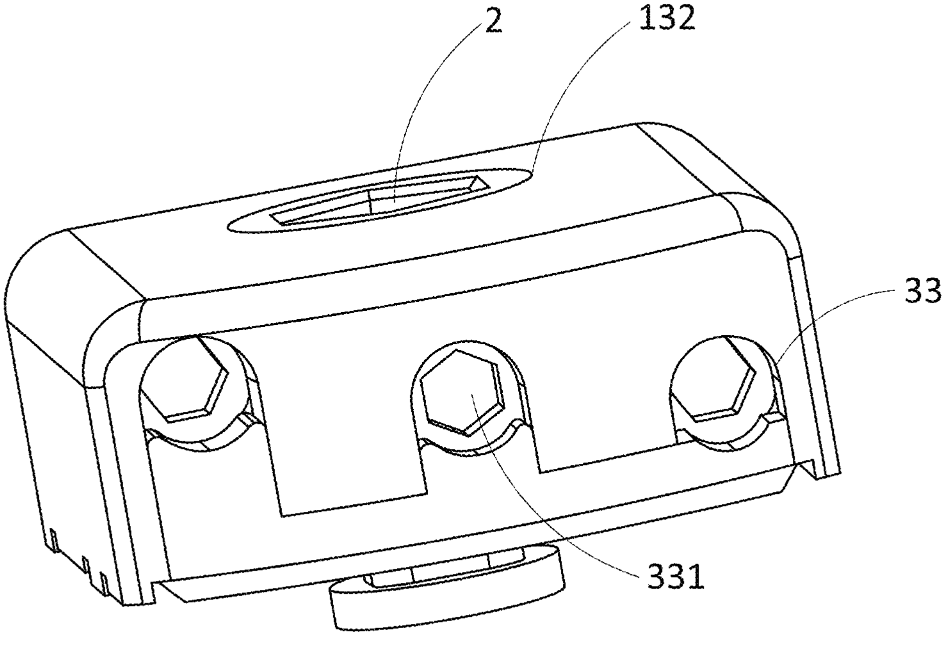
FIG. 2 shows a schematic structure diagram at right side of FIG. 1.
Figure 3:
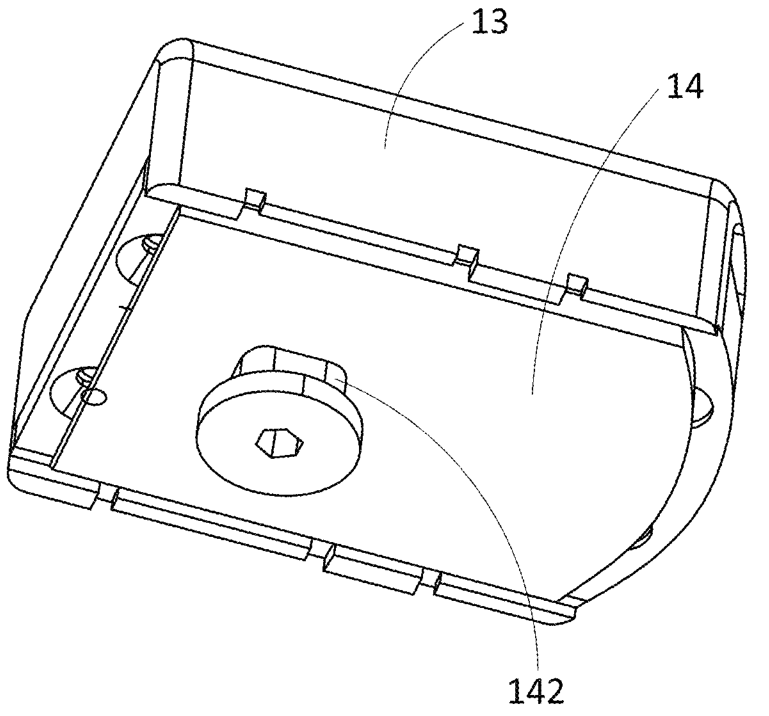
FIG. 3 shows a schematic structure diagram at down side of FIG. 1.

In conjunction with FIG. 2, a first adjustment groove 11 and a second adjustment groove 12 are arranged on two sides of the hinge seat 1, wherein two ends of the first adjustment mechanism 3 separately move at the first adjustment groove 11 and the second adjustment groove 12, and the first adjustment groove 11 is provided with and communicates with a plurality of upper grooves 111 equally spaced; one end of the first adjustment mechanism 3 is provided with lower grooves 31 corresponding to the upper grooves 111, wherein the plurality of upper grooves 111 and the lower grooves 31 cooperate to form adjustment holes 33 with different height; and ends of the first adjustment mechanism 3, the second adjustment mechanism 4, and the third adjustment mechanism 5 are separately provided with operation holes 331, and each operation hole 331 is corresponding to a different adjustment hole 33.

Since the adjustment hole 33 is located on one side of the door hinge and the door hinge is thin, when adjusting the position of the hinge core 2 after installing the door hinge between the cabinet door and the cabinet body, a single driving rod can be inserted into the operation hole 331 by the operator after passing through the adjustment hole 33, and fixed with the operation hole 331 (wherein the driving rod can be a screw tool, and the operation hole 331 can be a hole cooperating with the screw tool). The driving rod rotates to drive the first adjustment mechanism 3 to move back and forth at positions of the first adjustment groove 11 and the second adjustment groove 12, and the driving rod can be inserted in a narrower gap between the cabinet door and the cabinet body for operation. The adjustment mechanism of the door hinge can be adjusted only through the driving rod, and the driving rod only needs a smaller space for working, so that the adjustment operation for the hinge core 2 is convenient. The diameter of the adjustment hole 33 is smaller than the diameters of the ends of the first adjustment worm 1412, the second adjustment mechanism 4, and the third adjustment mechanism 5. This arrangement method avoids the first adjustment worm 1412, the second adjustment mechanism 4, and the third adjustment mechanism 5 from detaching from the door hinge at the adjustment hole 33 when they are adjusted to the limit position. The maximum width of the operation hole 331 is smaller than the diameter of the adjustment hole 33, so that the operation tool can pass through the adjustment hole 33 smoothly and then insert into the operation hole 331 during the adjustment process.

Figure 6:
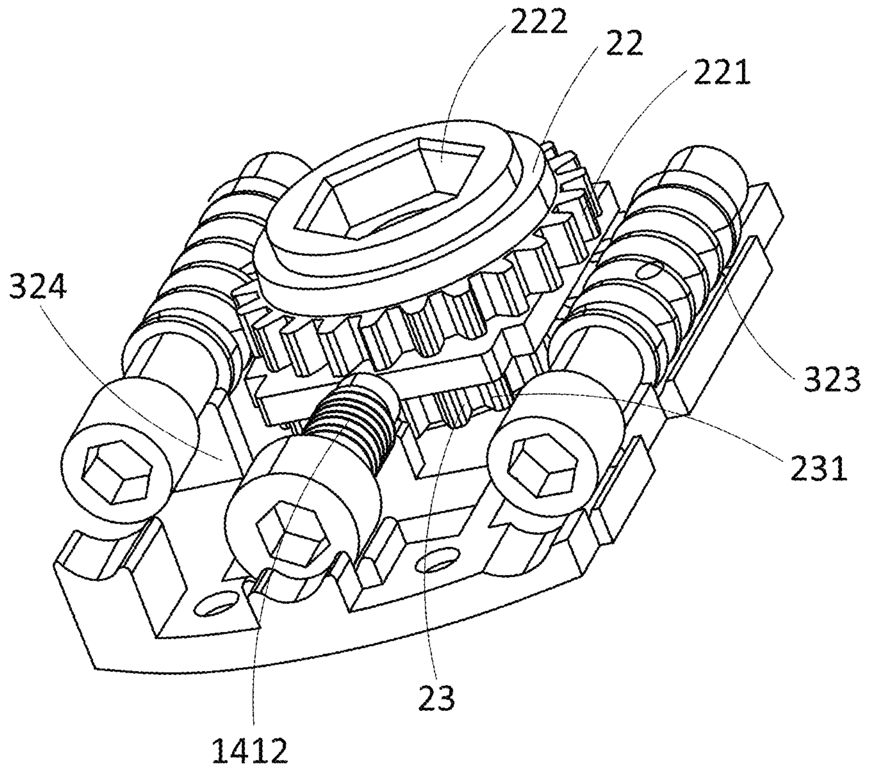
FIG. 6 shows a schematic structure diagram of the first adjustment mechanism, the second adjustment mechanism, and the third adjustment mechanism cooperating with the hinge core of the present disclosure.
Figure 7:
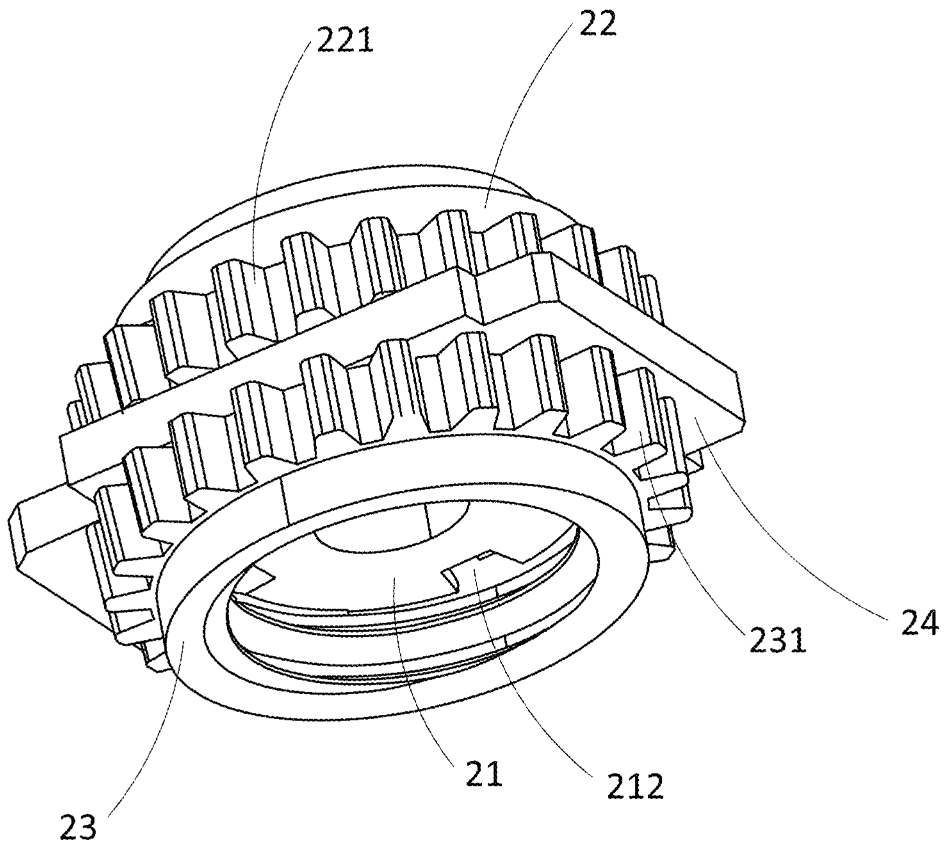
FIG. 7 shows a schematic structure diagram of the hinge core of the present disclosure.
Figure 8:
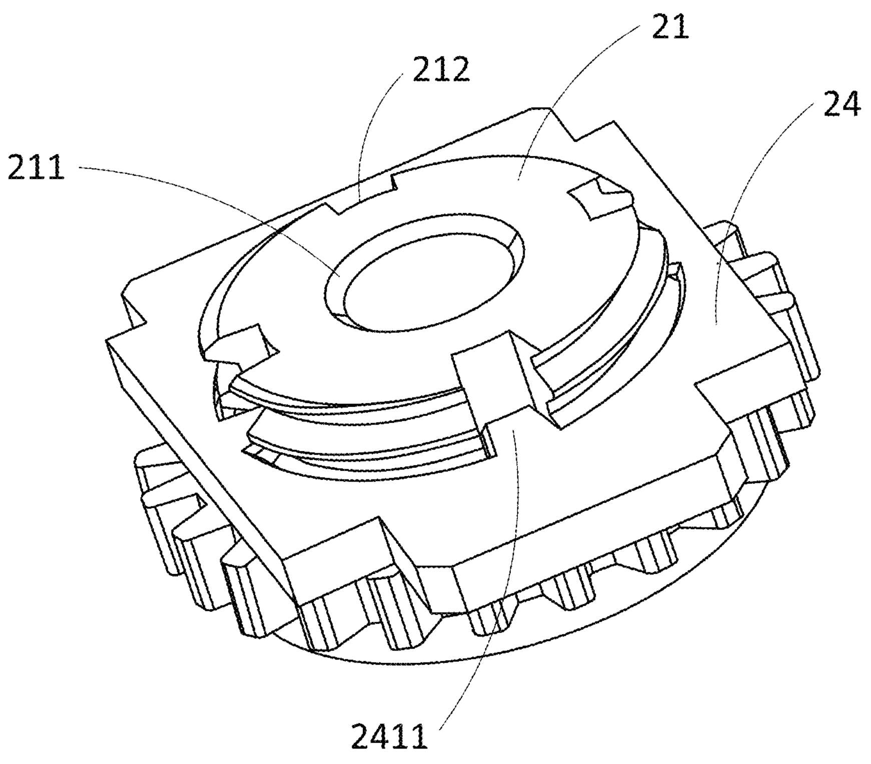
FIG. 8 shows a schematic structure diagram of FIG. 7 with the first adjustment part removed of the present disclosure.
Figure 9:
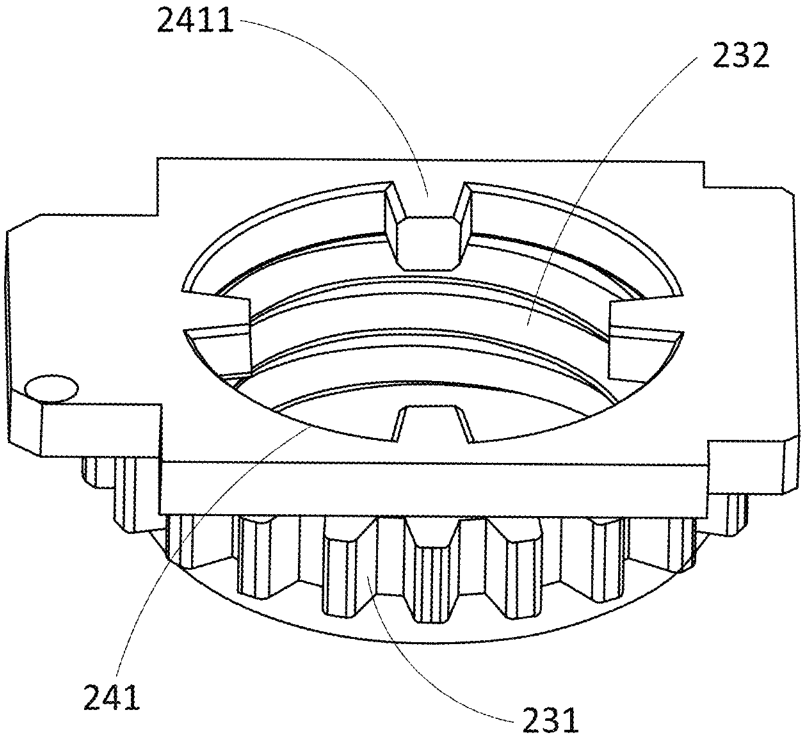
FIG. 9 shows a schematic structure diagram of FIG. 8 with the core part removed of the present disclosure.
Figure 10:
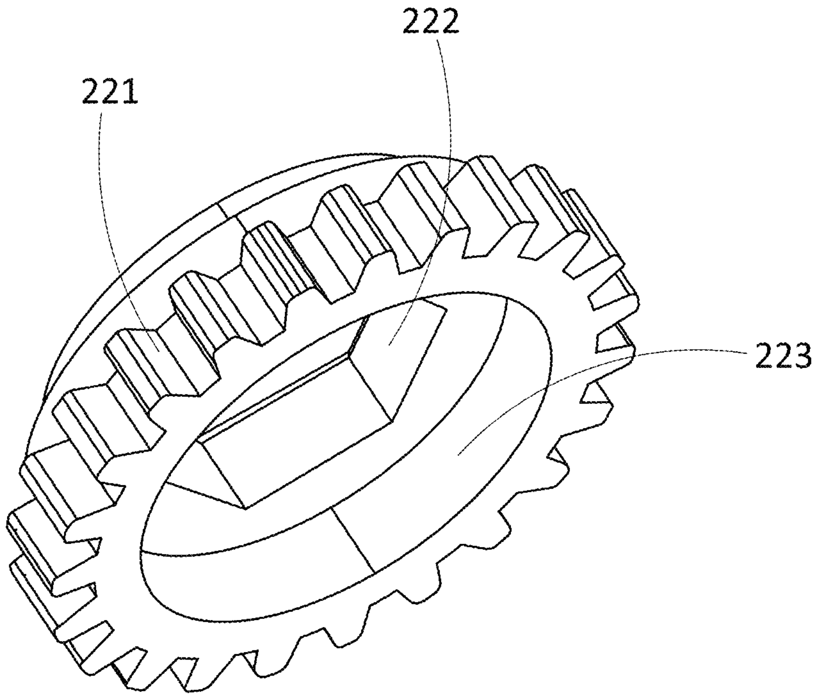
FIG. 10 shows a schematic structure diagram of the first adjustment part of the present disclosure.
Figure 11:
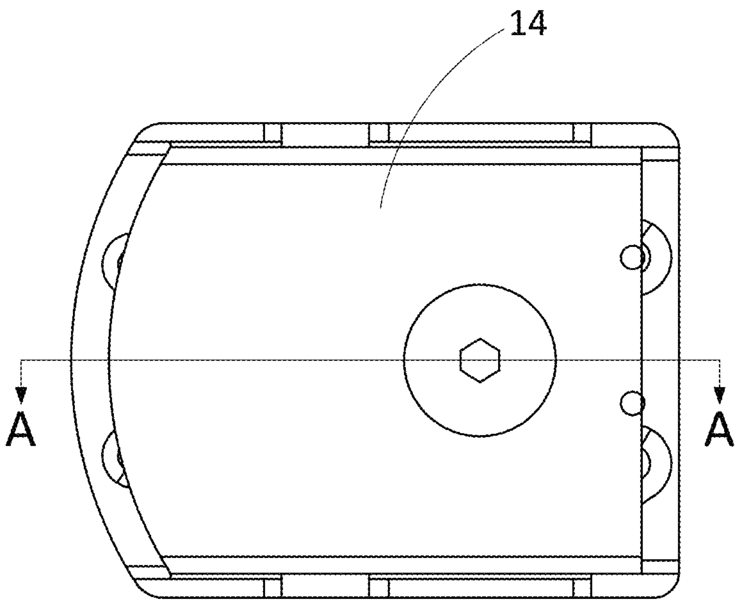
FIG. 11 shows a front view of the lower housing of the present disclosure.
Figure 12:
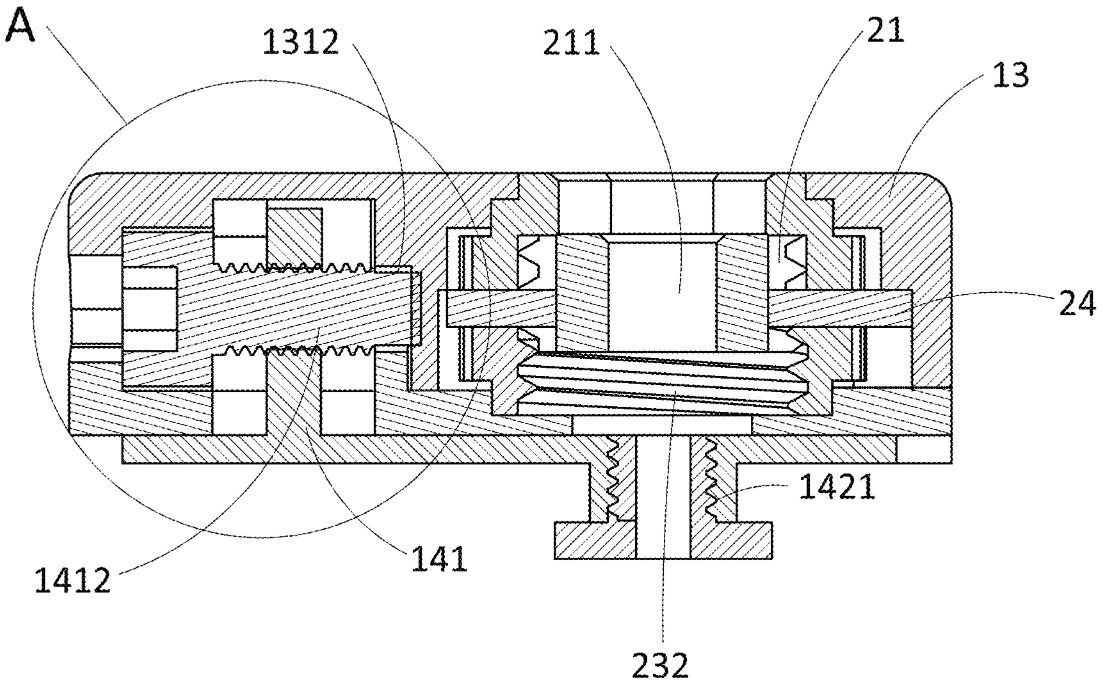
FIG. 12 shows a schematic sectional diagram at part A-A of FIG. 11 of the present disclosure.
Figure 13:
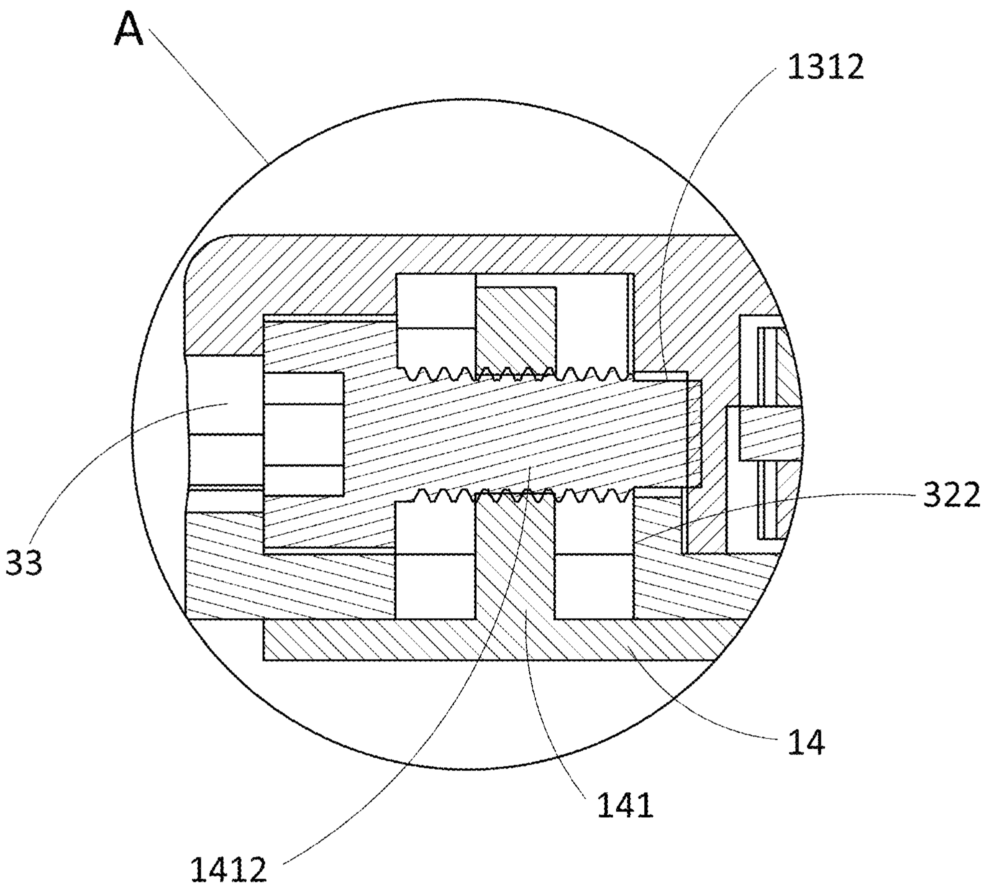
FIG. 13 shows a schematic structure diagram between the adjustment hole corresponding to the first adjustment worm and the third circular hole.
Figure 14:
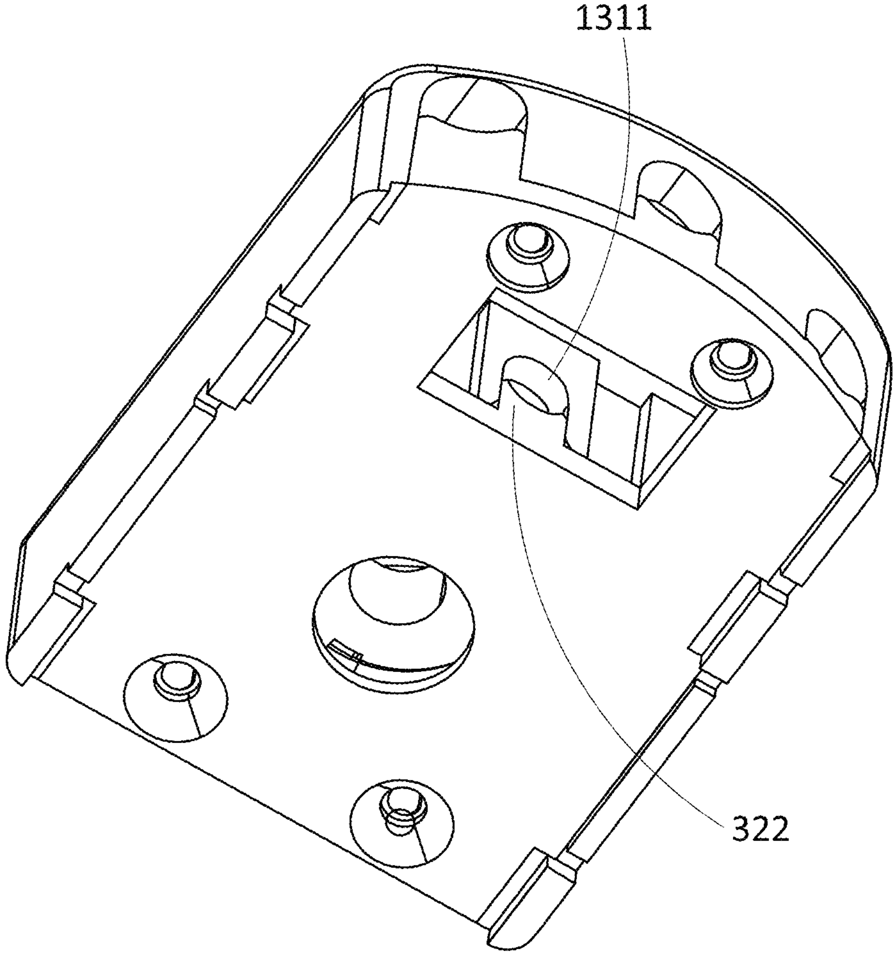
FIG. 14 shows a schematic structure diagram at the third circular hole.
Figure 15:
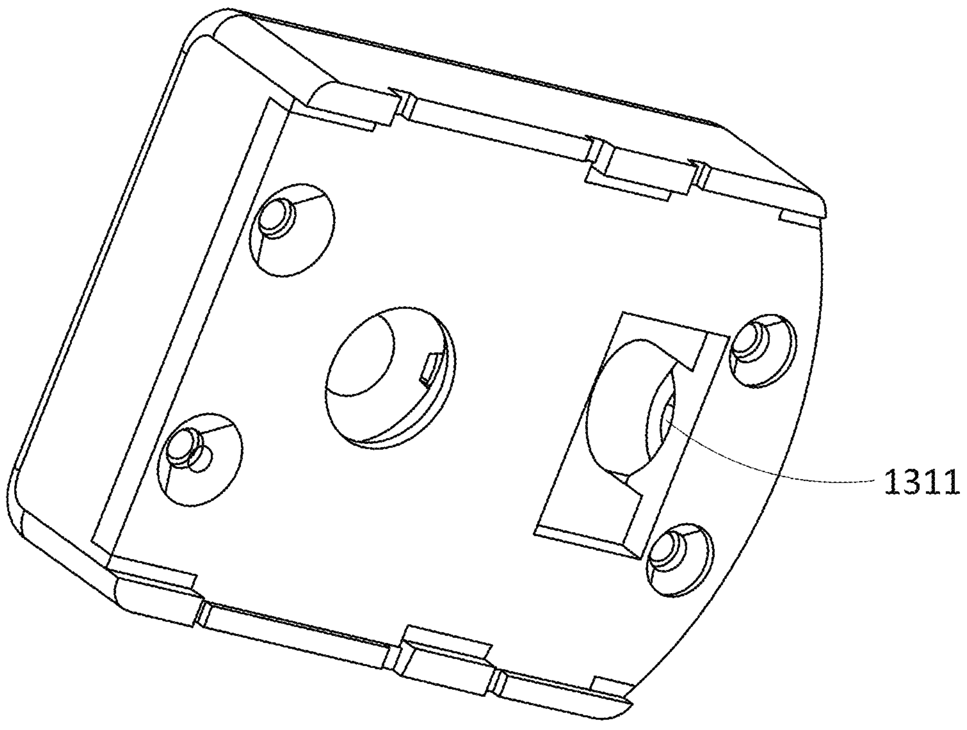
FIG. 15 shows a schematic structure diagram of the adjustment hole corresponding to the first adjustment worm.

In conjunction with FIG. 6 and FIG. 12, a mounting part 142 is arranged vertically and integrally on a bottom of the lower housing 14; a screw thread hole 1421 is arranged in the mounting part 142; and the screw thread hole 1421 is arranged coaxially with the hinge core 2. The first adjustment mechanism 3 includes a support plate 32, and a movable hole 321 is arranged on one side of the support plate 32 away from the hinge core 2. The hinge seat 1 includes an upper housing 13 and a lower housing 14, and the hinge core 2 is located between the upper housing 13 and the support plate 32; the first adjustment part 22 and the second adjustment part 23 rotationally cooperate with the upper housing 13 and the support plate 32 respectively, wherein the lower housing 14 is fixedly provided with the supporting block 141, and the supporting block 141 cooperates with the first adjustment worm 1412 through screw threads; the upper housing 13 is provided therein with a baffle 131, wherein the baffle 131 extends from an inside wall of the upper housing 13 to a position between the first adjustment worm 1412 and the hinge core 2; the supporting block 141 is located in the movable hole 321; and the first adjustment worm 1412 rotates to drive the upper housing 13, the support plate 32, and the hinge core 2 to simultaneously move along a installation direction of the lower housing 14. The support plate 32 is fixedly provided with an insert block 322, and one side of the baffle 131 opposite to the first adjustment worm 1412 is provided with a curved groove 1311, wherein one side of the insert block 322 opposite to the upper housing 13 is inserted into the curved groove 1311 and cooperates with the curved groove 1311 to form a third circular hole 1312. In conjunction with FIG. 13-FIG. 15, the third circular hole 1312 is a blind hole without penetration; the diameter of the adjustment hole 33 corresponding to the first adjustment worm 1412 is smaller than the diameter of the first adjustment worm 1412; the diameter of the third circular hole 1312 is larger than the diameter of the first adjustment worm 1412; a region is formed between the adjustment hole 33 corresponding to the first adjustment worm 1412 and the third circular hole 1312 to accommodate the rotation of the first adjustment worm 1412 and to keep the first adjustment worm 1412 from shifting; and one side of the first adjustment worm 1412 opposite to the hinge core 2 is rotationally arranged in the third circular hole 1312.

The process of fixing the door hinge on the cabinet door is that the mounting part 142 is inserted into a preload hole of the cabinet body; then a bolt is passed through the cabinet body and fixedly connected to the screw thread hole 1421 of the mounting part 142; and the lower housing 14 is fixed on the cabinet body. The first adjustment worm 1412 is located within the third circular hole 1312 formed by the baffle 131 cooperating with the curved groove 1311, and in conjunction with the arrangement method of the size of the adjustment hole 33, the first adjustment worm 1412 is located between the baffle 131 of the upper housing 13 and the side wall of the upper housing 13. Therefore, the first adjustment worm 1412 is limited between the adjustment hole 33 and the baffle 131, and at the same time, the top and the bottom of the hinge core 2 rotationally cooperate with the upper housing 13 and the support plate 32 respectively, so that the upper housing 13, the support plate 32, and the hinge core 2 form a whole. During the process of driving the first adjustment worm 1412 to rotate, the first adjustment worm 1412 rotates only between the third circular hole 1312 and the adjustment hole 33. Meanwhile, because the lower housing 14 is fixed on the cabinet body and the supporting block 141 is fixedly connected to the lower housing 14, when the first adjustment worm 1412 rotates and the position threaded connection with the supporting block 141 changes, three of the upper housing 13, the support plate 32, and the hinge core 2 move simultaneously in a straight line with the position change of the first adjustment worm 1412, so that the position of the hinge core 2 is adjusted along the arrangement direction of the door hinge by the process.

One side of the support plate 32 is provided with a rotary groove 323, and the second adjustment mechanism 4 is rotationally arranged in the rotary groove 323; the other side of the support plate 32 is provided with a support frame 324, and the third adjustment mechanism 5 is rotationally arranged on the support frame 324, wherein one side of the upper housing 13 is provided with a first circular hole 132, and the support plate 32 is provided with a second circular hole 325 corresponding to the first circular hole 132, wherein the first adjustment part 22 is rotationally arranged in the first circular hole 132, and the second adjustment part 23 is arranged in the second circular hole 325.

Figure 4:
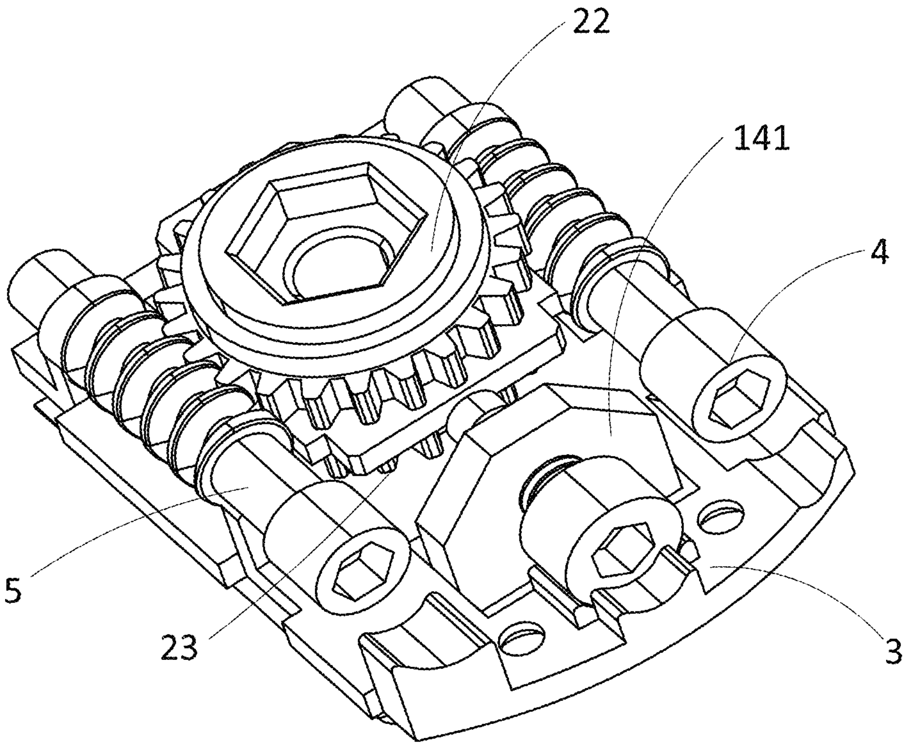
FIG. 4 shows a schematic structure diagram of FIG. 1 with upper housing removed.
Figure 5:
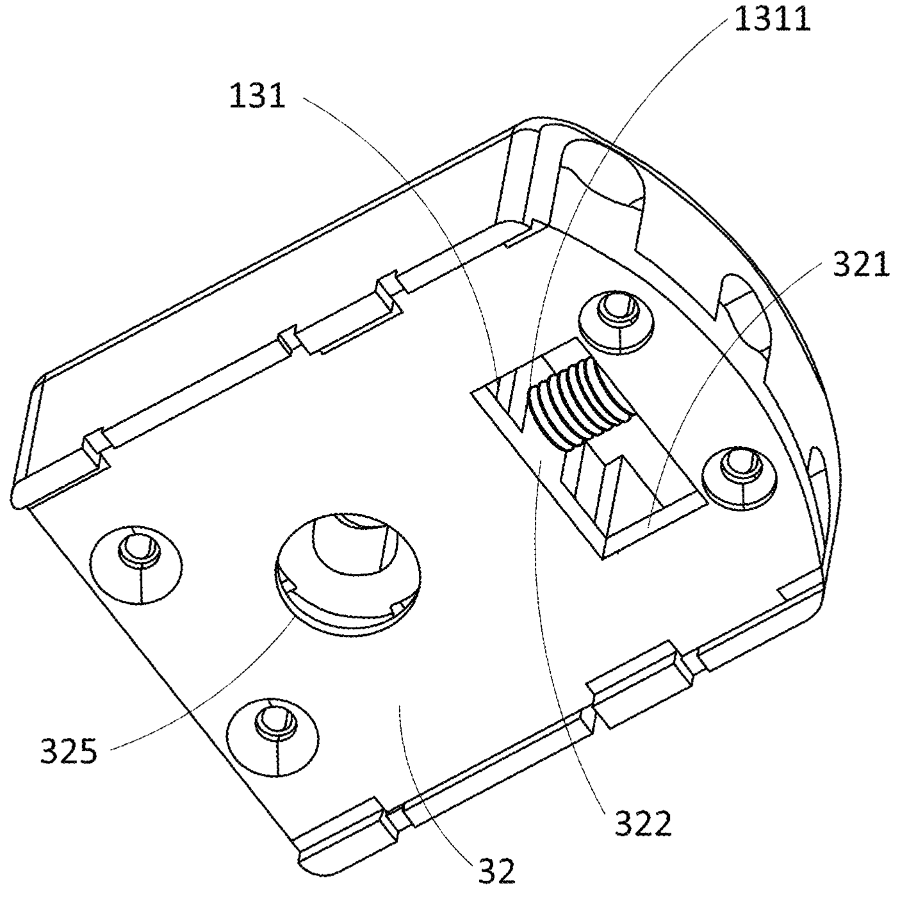
FIG. 5 shows a schematic structure diagram at down side of FIG. 4.

In conjunction with FIG. 4 and FIG. 6, when the second adjustment mechanism 4 and the third adjustment mechanism 5 are driven by the operation tool, the second adjustment mechanism 4 rotates in the rotary groove 323, and the third adjustment mechanism 5 rotates on the support frame 324. When the third adjustment mechanism 5 rotates to drive the first adjustment part 22 to rotate, one end of the first adjustment part 22 is rotationally arranged inside the first circular hole 132; and when the second adjustment mechanism 4 rotates to drive the second adjustment part 23 to rotate, one end of the second adjustment part 23 is rotationally arranged inside the second circular hole 325. The self-rotations of the second adjustment mechanism 4 and the third adjustment mechanism 5 are converted into the rotations of the first adjustment part 22 and the second adjustment part 23, so that they perform a circular movement in a plane. The first adjustment part 22 rotates to drive the polygonal holes 222 arranged on the top of the first adjustment part 22 to rotate at a certain angle, so as to change the preload angle. The second adjustment part 23 rotates to drive the second cylindrical hole 232 inside it to rotate, and the internal screw threads of the second cylindrical hole 232 cooperate with the external screw threads of the core part 21 to drive the core part 21 to move in the direction perpendicular to the installation direction of the door hinge, so as to adjust a depth position of the core part 21 in the hinge core 2.

In conjunction with FIG. 7-FIG. 10, a first gear ring 221 is fixedly arranged outside the first adjustment part 22 along its circumference, and the third adjustment mechanism 5 engages with the first gear ring 221 to drive the first gear ring 221 to rotate; one end of the first adjustment part 22 away from the core part 21 is provided with a polygonal hole 222, and one end of the first adjustment part 22 corresponding to the core part 21 is provided with a first cylindrical hole 223, wherein the core part 21 is movably arranged in the first cylindrical hole 223; the polygonal hole 222 communicates with the first cylindrical hole 223; and a diameter of the first cylindrical hole 223 is larger than a maximum width of the polygonal hole 222.

During the rotation process of the third adjustment mechanism 5, the third adjustment mechanism 5 engages with the first gear ring 221 outside the first adjustment part 22. The third adjustment mechanism 5 rotates to drive the first adjustment part 22 to rotate, and the polygonal hole 222 arranged on the body of the first adjustment part 22 is driven to rotate a certain angle during the rotation process, so as to adjust the preload angle.

A second gear ring 231 is fixedly arranged outside the second adjustment part 23 along its circumference, and the second adjustment mechanism 4 engages with the first gear ring 231 to drive the second gear ring 231 to rotate; and the second adjustment part 23 is provided with a second cylindrical hole 232 along its axial direction, wherein a surface of the second cylindrical hole 232 is provided with internal screw threads; the outside of the core part 21 is provided with external screw threads; and the internal screw threads are connected threadedly with the external screw threads.

During the rotation process of the second adjustment mechanism 4, the second adjustment mechanism 4 engages with the second gear ring 231 outside the second adjustment part 23, and the second adjustment mechanism 4 rotates to drive the second adjustment part 23 to rotate. During the rotation process, the second adjustment part 23 drives the cooperation position of the internal screw threads of the inside wall and the external screw threads outside the core part 21 to change, and drives the core part 21 to change along the axial direction of the second cylindrical hole 232. Since the axial directions of the first cylindrical hole 223 and the second cylindrical hole 232 are perpendicular to the arrangement direction of the door hinge, the adjustment of the cooperation depth of the door shaft and the hinge core 2 is realized by the position change of the core part 21 in the direction perpendicular to the arrangement direction of the door hinge.

A third cylindrical hole 211 passes through a center of the core part 21 in its axial direction, wherein the first cylindrical hole 223, the second cylindrical hole 232, and the third cylindrical hole 211 are coaxially arranged; the core part 21 moves in the first cylindrical hole 223 and the second cylindrical hole 232 along their axial directions; and a diameter of the core part 21 is larger than the maximum width of the polygonal hole 222 and smaller than the diameter of the first circular hole 223, so as to ensure that the core part 21 only moves within the first cylindrical hole 223 and the second cylindrical hole 232 and to avoid the core part 21 from detaching out of the hinge core 2, wherein the third cylindrical hole 211 arranged in the core part 21 facilitates the door shaft to be inserted therein.

A surface of the core part 21 is provided with a plurality of sliding grooves 212 equally spaced in an axial direction, and a spacer plate 24 is arranged between the first adjustment part 22 and the second adjustment part 23, wherein the spacer plate 24 is provided with a fourth cylindrical hole 241; a surface of the fourth cylindrical hole 241 is fixedly provided with guide blocks 2411 corresponding to the sliding grooves 212; and the guide blocks 2411 are inserted into the sliding grooves 212 and movably cooperate with the sliding grooves 212. During the process that the core part 21 moves to the first cylindrical hole 223 along the axial direction of the second cylindrical hole 232, the core part 21 passes through the fourth cylindrical hole 241 on the spacer plate 24. The position adjustment of the core part 21 during the linear movement process is realized by the movement of the guide blocks 2411 in the sliding grooves 212, so as to avoid the core part 21 from rotating in a circumferential direction.

The door shaft and the door hinge at lower right corner of a normal refrigerator with a door opened at the right are taken as an example to illustrate the door hinge of the present disclosure. The lower housing 14 is mounted and fixed to the lower right side of the cabinet body by the mounting part 142, and the door shaft on the cabinet door is inserted into the hinge core 2, at which time the upper housing 13 and the internal hinge core 2 are located between the cabinet door and the cabinet. When it needs to fine adjust the cooperation position of the cabinet door and the cabinet body, so that there is no deviation in both the horizontal and vertical directions of the cabinet door, the operator inserts the operation tool into the operation hole 331 along the adjustment hole 33 when inserting it between the cabinet door and the cabinet body. When adjusting the position of the cabinet door in the horizontal direction, the first adjustment worm 1412 is driven to rotate, so as to drive the upper housing 13, the hinge core 2, and the support plate 32 to move to a suitable position in the horizontal direction. At this time, the hinge core 2 cooperating with the end of the door shaft moves in the horizontal direction, so as to realize the adjustment of the cabinet door in the horizontal direction. When adjusting the position of the cabinet door in the direction perpendicular to the ground, the second adjustment mechanism 4 is driven to rotate, so that the second adjustment part 23 is driven to rotate, and the second adjustment part 23 rotationally drives the internal core part 21 to move up and down. At this time, the core part 21 cooperating with the end part of door shaft is in the vertical direction, so that the height of the cabinet door in the vertical direction can be adjusted. The foregoing two processes realize the adjustment of the hinge core 2 in the left-right direction and the up-down direction. After adjusted by the foregoing adjustment processes, the third adjustment mechanism 5 is driven to drive the first adjustment part 22 to rotate, and the first adjustment part 22 rotates to drive the polygonal hole 222 to rotate to an appropriate preload angle. The door hinge has a compact structure and smaller volume, and can realize the adjustment process in the limited space, so that the operation is convenient.

In the description of the present disclosure, it is to be understood that orientation or positional relationships indicated by terms, such as "lengthways", "crosswise", "up", "down", "front", "back", "left", "right", "vertical", "horizontal", "top", "bottom", "inside", "outside", are the orientation or positional relationships based on the drawings, which are only to facilitate the description of the present disclosure and simplify the description, and are not to indicate or imply that the device or element referred to must have a particular orientation, or be constructed and operated with a particular orientation, and are not to be understood as limitations of the present disclosure. In the description of the present disclosure, unless otherwise specified and limited, it is to be noted that the terms "mount", "link", and "connect" are to be understood in a broad sense, e.g., it can be a mechanical connection or an electrical connection, or it can be a communication inside two elements; and it can be a direct connection, or it can be an indirect connection through an intermediary medium. For a person of ordinary skill in the art, the specific meanings of the above terms can be understood on specific situations.

The above is only preferred embodiments of the present disclosure, and is not intended to limit the present disclosure. Any modifications, equivalent substitutions, improvements, etc., made within the spirit and principles of the present disclosure, shall be included in the scope of protection of the present disclosure.

What is claimed is:

1. A door hinge, wherein the door hinge is fixedly arranged on a cabinet body, and the door hinge comprises a hinge seat and a hinge core, wherein the hinge seat comprises an upper housing and a lower housing and the hinge seat has an accommodation cavity, and the hinge core is located in the accommodation cavity of the hinge seat for connecting to a door shaft, wherein the hinge seat therein has a first adjustment mechanism moving back and forth along an installation direction of the hinge seat, wherein the installation direction is a horizontal direction perpendicular to door shaft; the hinge core is located on one side of the first adjustment mechanism, wherein the hinge core comprises a core part, a first adjustment part, and a second adjustment part, an end of the door shaft passes through the first adjustment part, the core part, and the second adjustment part of the hinge core in sequence; both the second adjustment part and the first adjustment part are located outside the core part, and the first adjustment part is located at one end of the second adjustment part away from the lower housing of the hinge seat;

the accommodation cavity is further provided therein with a second adjustment mechanism and a third adjustment mechanism; and the hinge core, the second adjustment mechanism, and the third adjustment mechanism move simultaneously with the first adjustment mechanism, wherein the first adjustment mechanism moves to drive the hinge core to move simultaneously in the installation direction; during a movement of the hinge core in the installation direction, the second adjustment mechanism is driven to drive the second adjustment part to rotate, to drive the core part to move along a direction perpendicular to the installation direction of the hinge seat; and the third adjustment mechanism drives the first adjustment part to rotate, to adjust a rotation position of the hinge core, wherein a surface of the core part is provided with a plurality of sliding grooves equally spaced in an axial direction of the core part, and a spacer plate is arranged between the first adjustment part and the second adjustment part, wherein the spacer plate is provided with a fourth cylindrical hole; a surface of the fourth cylindrical hole is fixedly provided with guide blocks corresponding to the sliding grooves; and the guide blocks are inserted into the sliding grooves and movably cooperate with the sliding grooves.

2. The door hinge according to claim 1, wherein a first adjustment groove and a second adjustment groove are separately arranged on two sides of the hinge seat, and two ends of the first adjustment mechanism separately move at the first adjustment groove and the second adjustment groove, wherein the first adjustment groove is provided with and communicates with a plurality of upper grooves equally spaced, and one end of the first adjustment mechanism is provided with lower grooves corresponding to the upper grooves, wherein the plurality of upper grooves and the lower grooves cooperate to form adjustment holes with different height, wherein ends of the first adjustment mechanism, the second adjustment mechanism, and the third adjustment mechanism are separately provided with operation holes, and each operation hole is corresponding to a different adjustment hole.

3. The door hinge according to claim 1, wherein the first adjustment mechanism comprises a support plate, and a movable hole is arranged on one side of the support plate away from the hinge core, wherein the hinge core is located between the upper housing and the support plate; and the first adjustment part and the second adjustment part rotationally cooperate with the upper housing and the support plate respectively, wherein the lower housing is fixedly provided with a supporting and the upper housing is provided therein with a baffle, and the baffle extends from an inside wall of the upper housing to a position between the first adjustment worm and the hinge core, wherein the supporting block is movably arranged in the movable hole, and the first adjustment worm rotates to drive the upper housing, the support plate, and the hinge core to simultaneously move along a installation direction of the lower housing.

4. The door hinge according to claim 3, wherein the support plate is fixedly provided with an insert block, and one side of the baffle opposite to the first adjustment worm is provided with a curved groove, wherein one side of the insert block opposite to the upper housing is inserted into the curved groove and cooperates with the curved groove to form a third circular hole, and one side of the first adjustment worm opposite to the hinge core is rotationally arranged in the third circular hole.

5. The door hinge according to claim 3, wherein one side of the support plate is provided with a rotary groove, and the second adjustment mechanism is rotationally arranged in the rotary groove; and the other side of the support plate is provided with a support frame, and the third adjustment mechanism is rotationally arranged on the support frame, wherein one side of the upper housing is provided with a first circular hole, and the support plate is provided with a second circular hole corresponding to the first circular hole, wherein the first adjustment part rotationally cooperates with the first circular hole, and the second adjustment part rotationally cooperates with the second circular hole.

6. The door hinge according to claim 1, wherein a first gear ring is fixedly arranged outside the first adjustment part along a circumference of the first adjustment part, and the third adjustment mechanism engages with the first gear ring to drive the first gear ring to rotate; one end of the first adjustment part away from the core part is provided with a polygonal hole; and one end of the first adjustment part corresponding to the core part is provided with a first cylindrical hole, wherein the core part is movably arranged in the first cylindrical hole; the polygonal hole communicates with the first cylindrical hole; and a diameter of the first cylindrical hole is larger than a maximum width of the polygonal hole.

7. The door hinge according to claim 6, wherein a second gear ring is fixedly arranged outside the second adjustment part along a circumference of the second adjustment part, and the second adjustment mechanism engages with the second gear ring to drive the second gear ring to rotate; and the second adjustment part is provided with a second cylindrical hole along an axial direction of the second adjustment part, wherein a surface of the second cylindrical hole is provided with internal screw threads; an outside of the core part is provided with external screw threads; and the internal screw threads are connected threadedly with external screw threads of the second cylindrical hole.

8. The door hinge according to claim 7, wherein a third cylindrical hole passes through a center of the core part along an axial direction of the core part, wherein the first cylindrical hole, the second cylindrical hole, and the third cylindrical hole are coaxially arranged, and the second cylindrical hole threadedly cooperates with the core part to drive the core part to move along axial directions of the first cylindrical hole, the third cylindrical hole, and the second cylindrical hole, wherein and a diameter of the core part is larger than the maximum width of the polygonal hole and smaller than the diameter of the first cylindrical hole.

9. The door hinge according to claim 1, wherein a mounting part is arranged vertically and integrally on a bottom of the lower housing; a screw thread hole is arranged in the mounting part; and the screw thread hole is arranged coaxially with the hinge core.

* * * * *